INVENTORS
THOMAS M. DAUPHINEE &
HUGH PRESTON-THOMAS
BY- Smart + Biggar.
ATTORNEYS.

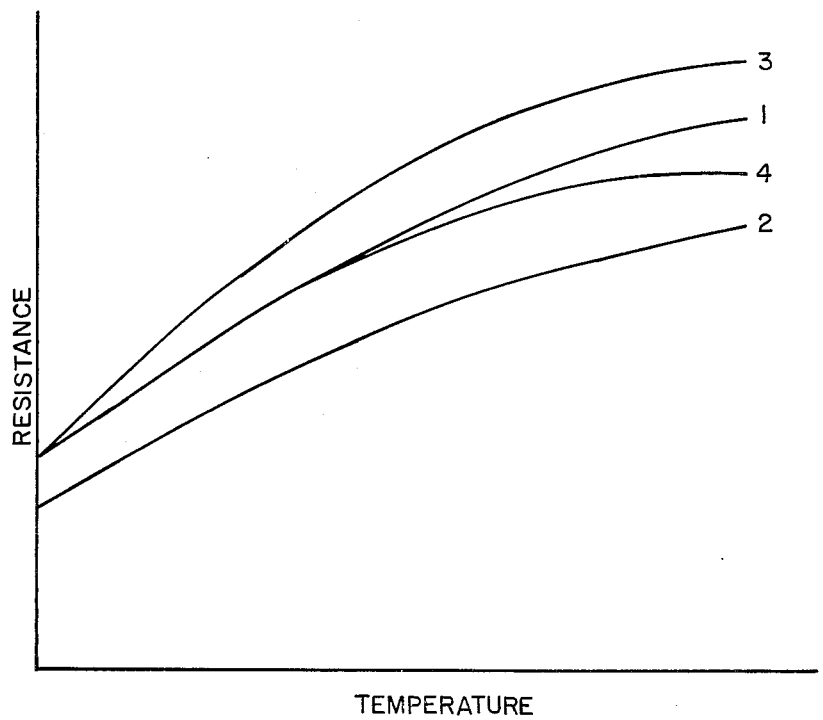
FIG. I
INVENTORS
THOMAS M. DAUPHINEE &
HUGH PRESTON-THOMAS
BY- Smart + Biggar
ATTORNEYS.

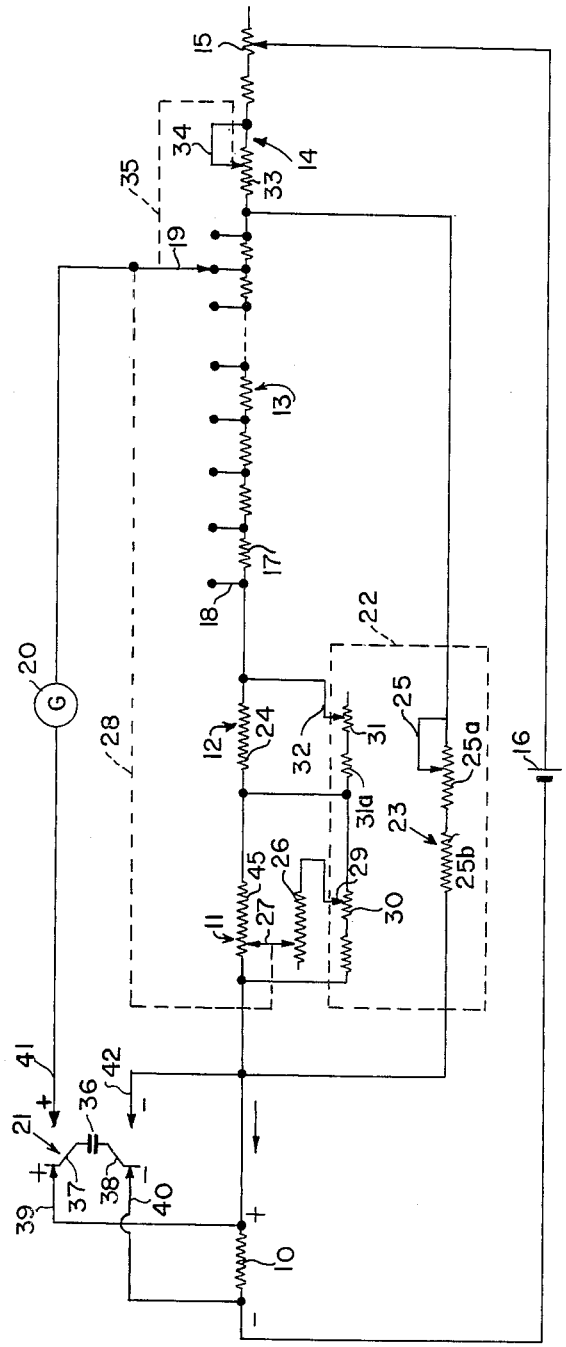

INVENTORS
THOMAS M. DAUPHINEE &
HUGH PRESTON-THOMAS
BY- Smart + Biggar.
ATTORNEYS

United States Patent Office 2,993,377
Patented July 25, 1961

2,993,377
DIRECT READING RESISTANCE THERMOMETER
Thomas McCaul Dauphinee and Hugh Preston-Thomas, Ottawa, Ontario, Canada, assignors to National Research Council, Ottawa, Ontario, Canada
Filed Apr. 7, 1958, Ser. No. 726,784
10 Claims. (Cl. 73—362)

The present invention relates to a direct reading platinum resistance thermometer.

The platinum resistance thermometer is commonly used to measure temperatures in the range from −184 to +630° C. It is also used to define the international temperature scale between the above mentioned temperatures. Above 0° C. the temperature-resistance relationship of the platinum resistance thermometer is quadratic, while below 0° C. a quartic relationship is followed. However, it is to be noted that the deviation from the quadratic relationship down to a temperature of −50° C. is very small so that a good approximation of the temperature-resistance relationship of the platinum resistance thermometer in the range from −50° C. to +630° C. is, therefore, represented by a quadratic equation.

Prior to the present invention methods for determining temperature by a platinum resistance thermometer have involved the measurement of the resistance of the thermometer and then a calculation of the temperature by the solution of the fundamental equation, or by use of a set of temperature resistance tables. Even with the use of a calculating machine or a complete set of temperature tables for each thermometer, an appreciable time delay resulted while a calculation was being carried out. In order to overcome some of the delay involved in calculating the temperature equivalent of a particular resistance of the thermometer, platinum resistance thermometers are manufactured with the resistance and other parameters of the thermometer adjusted to facilitate calculation. A resistance of 25.5 ohms at 0° C. is normally chosen for platinum resistance thermometers since this value gives a sensitivity of approximately 0.1 ohm per ° C. in the region from 0 to 100° C. It has been found that this sensitivity facilitates the calculation of temperature from a resistance measurement.

According to my invention a direct reading resistance thermometer comprises a platinum resistance element having a quadratic temperature-resistance characteristic defined by the equation $R_T = R_0(1 + AT + BT^2)$ where $R_0$ is the resistance of the platinum element at 0° C. and where A and B are two constants determined by the temperature-resistance relation of the platinum resistance element. At least one tapped resistance element is calibrated to indicate directly at predetermined resistance values the temperature of the platinum resistance element corresponding to a plurality of temperatures defined by the quadratic temperature-resistance characteristic. A plurality of variable resistance elements are used in the thermometer circuit: a first element being adjusted for variations in $B/A$; a second element being adjusted for variations in A; a third element being adjusted to compensate for a non-linearity in current resulting from the quadratic temperature-resistance characteristic; and a fourth element being adjusted for variations in $R_0$. The variable and tapped elements are connected to form a resistance network which is connected in series with the platinum resistance element across terminals which are adapted to be connected to a source of direct current. Means are provided for determining the difference between the voltage measured across the platinum resistance element and the voltage measured across a part of the resistance network.

The present invention provides a direct reading resistance thermometer which may be used to measure temperatures in the range from −50 to +460° C. With the apparatus of the present invention the measurement of temperature with a platinum resistance thermometer is greatly facilitated in that no calculation is required since the apparatus itself indicates directly the temperature of the platinum resistance element.

The invention will now be described with reference to the following drawings in which:

FIGURE 1 is a graph representing the temperature-resistance relationship of a typical platinum resistance thermometer;

FIGURE 2 is a simplified schematic diagram of the circuit of the present invention;

Figure 3A:
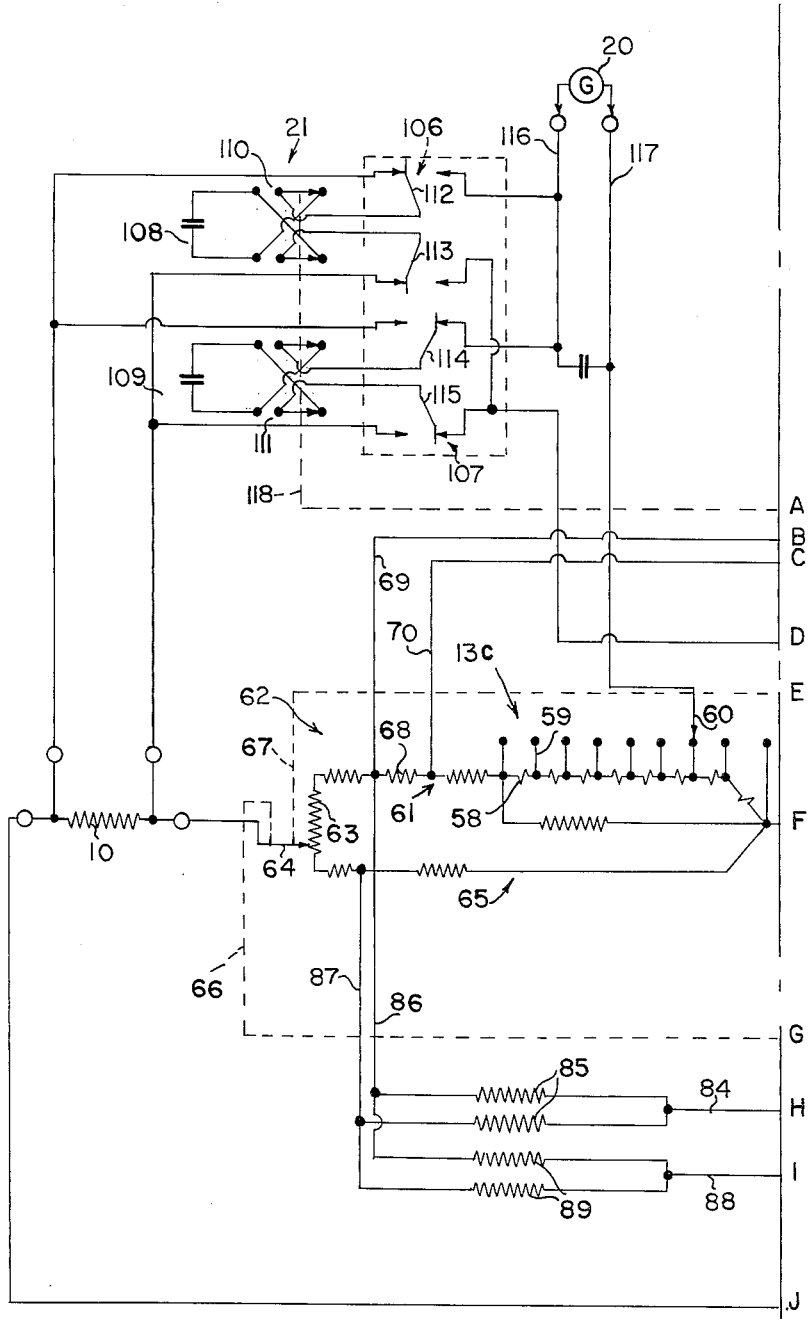
Figure 3B:
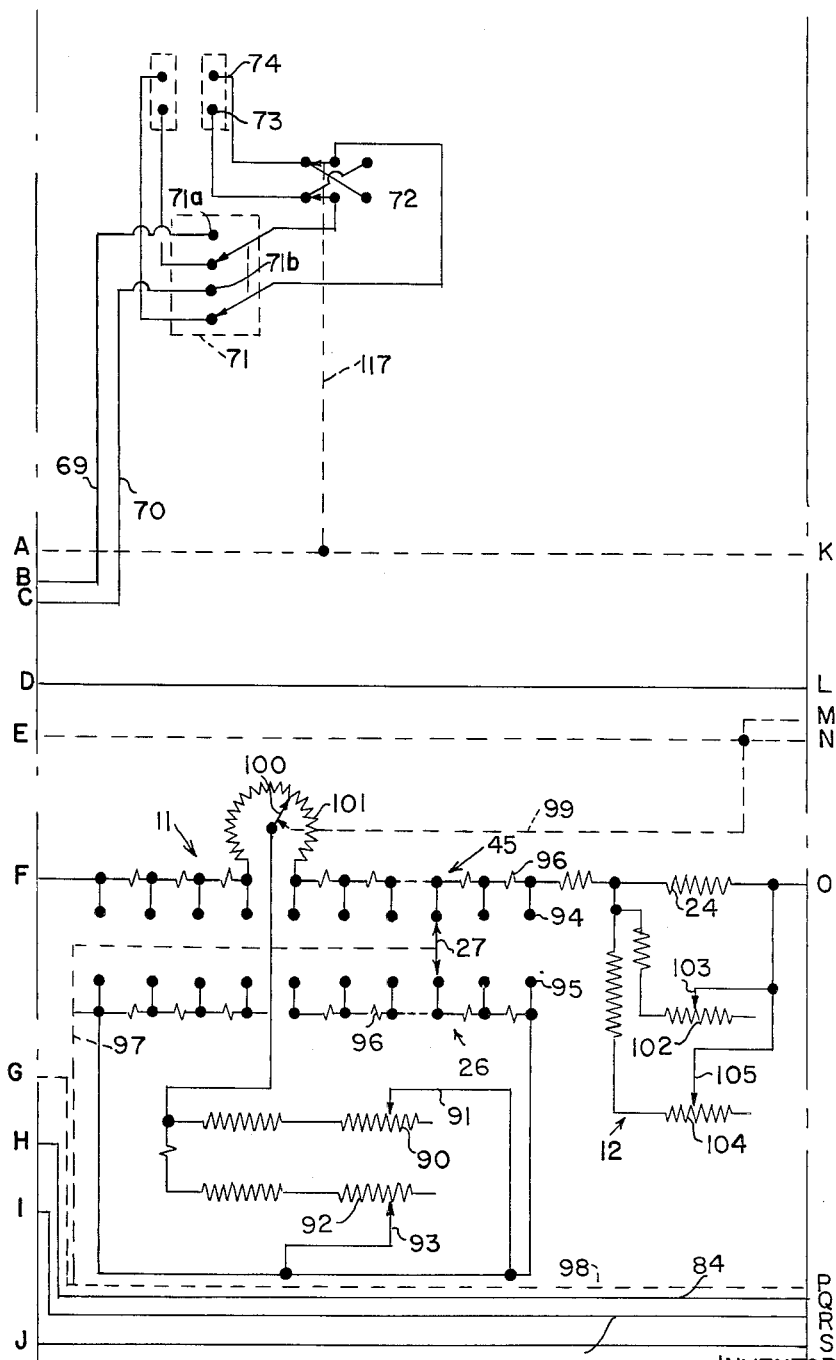
Figure 3C:
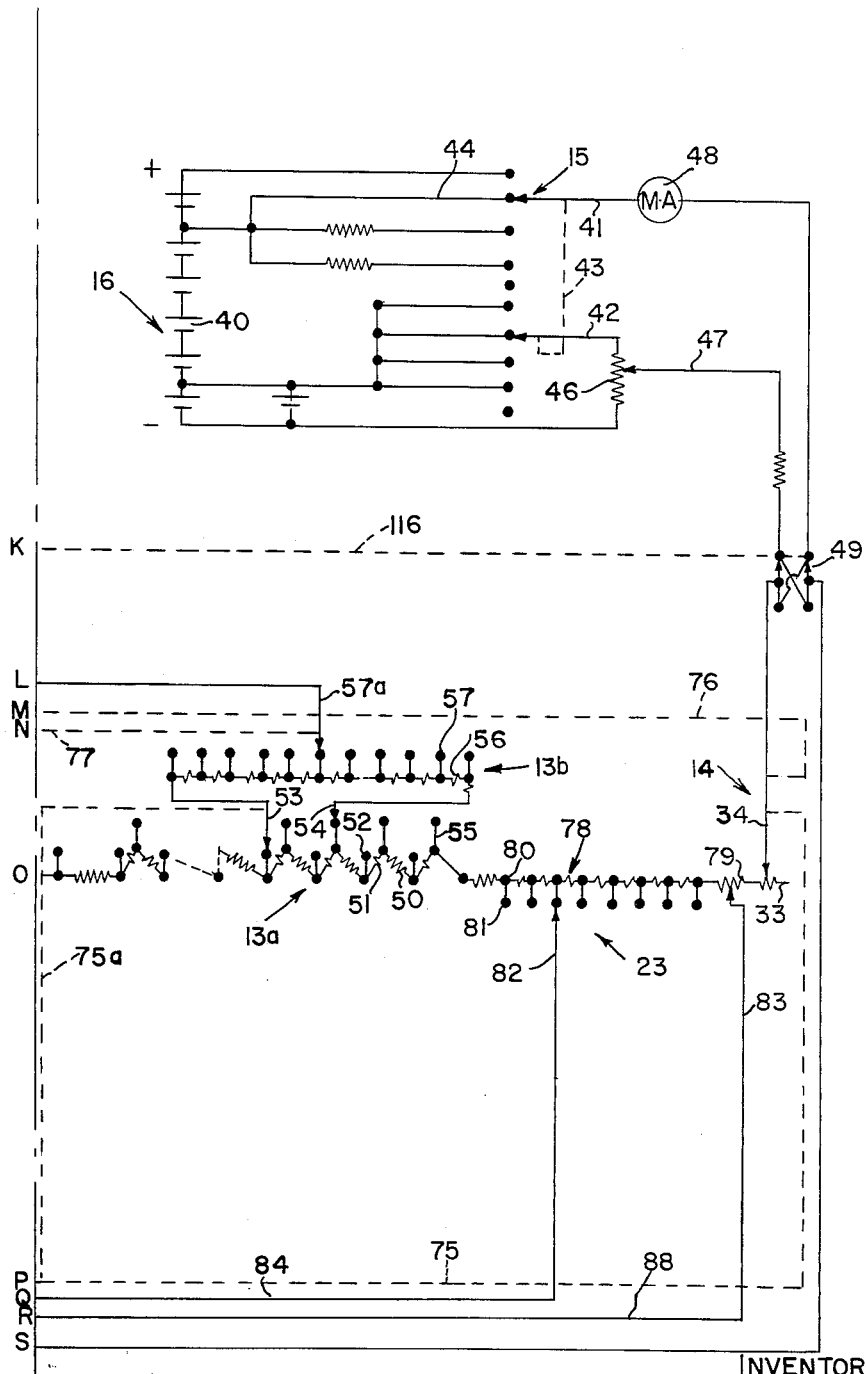
Figure 4A:
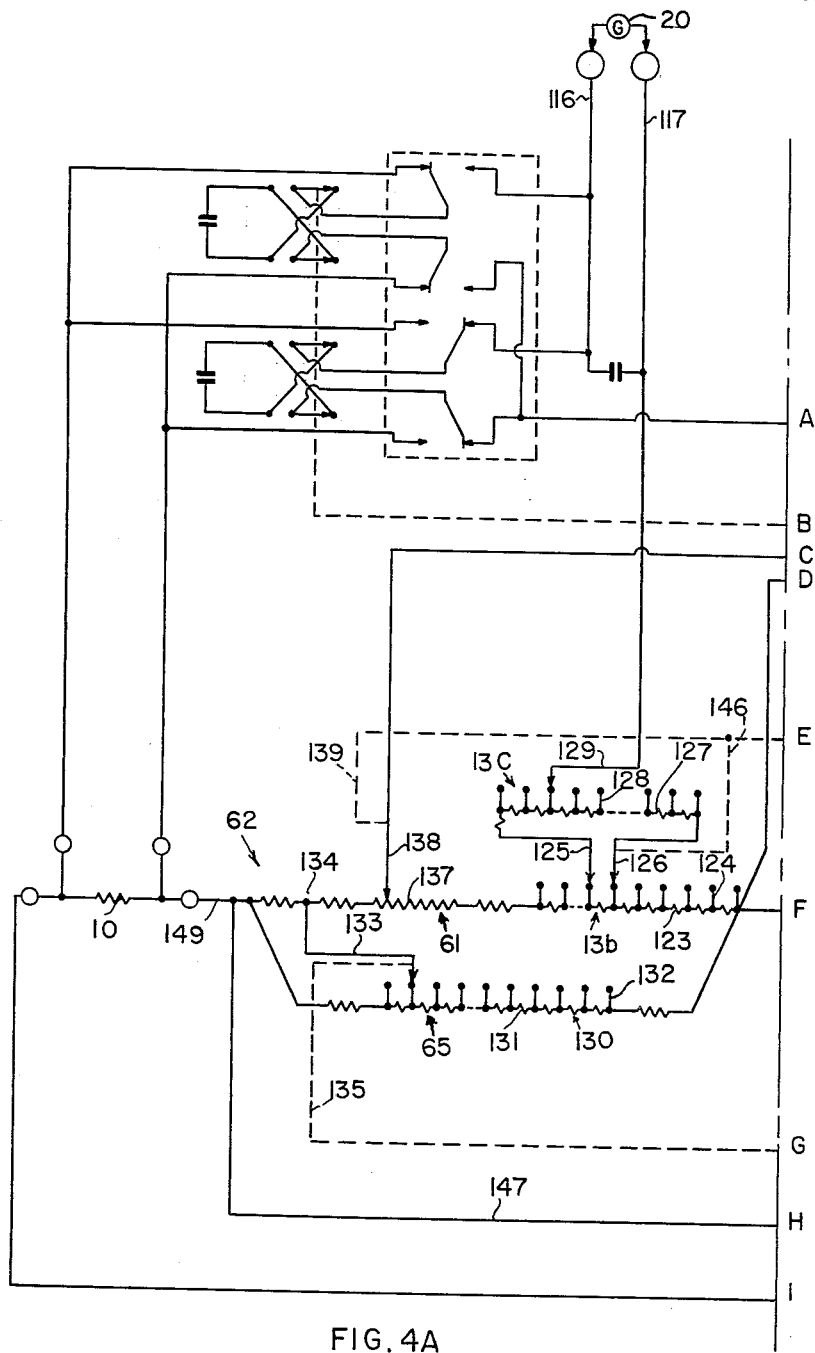
Figure 4C:
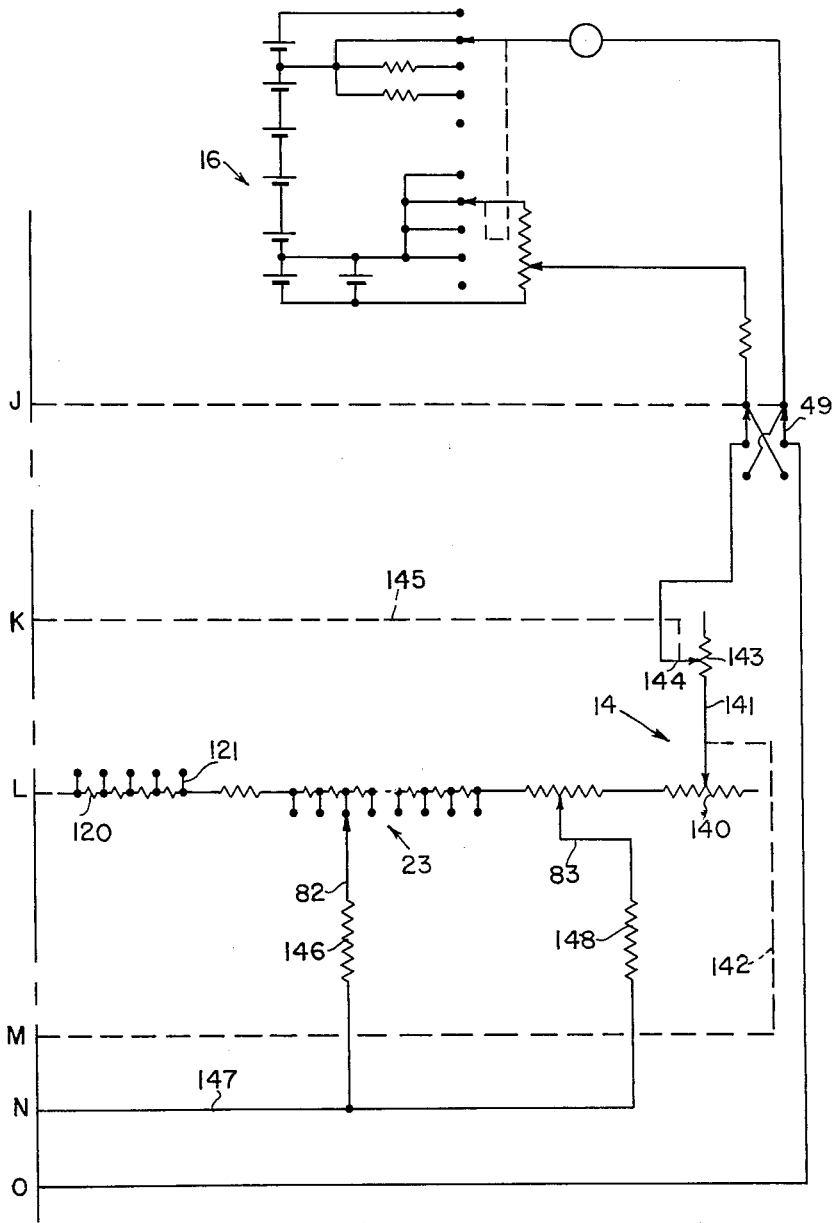
Figure 4B:
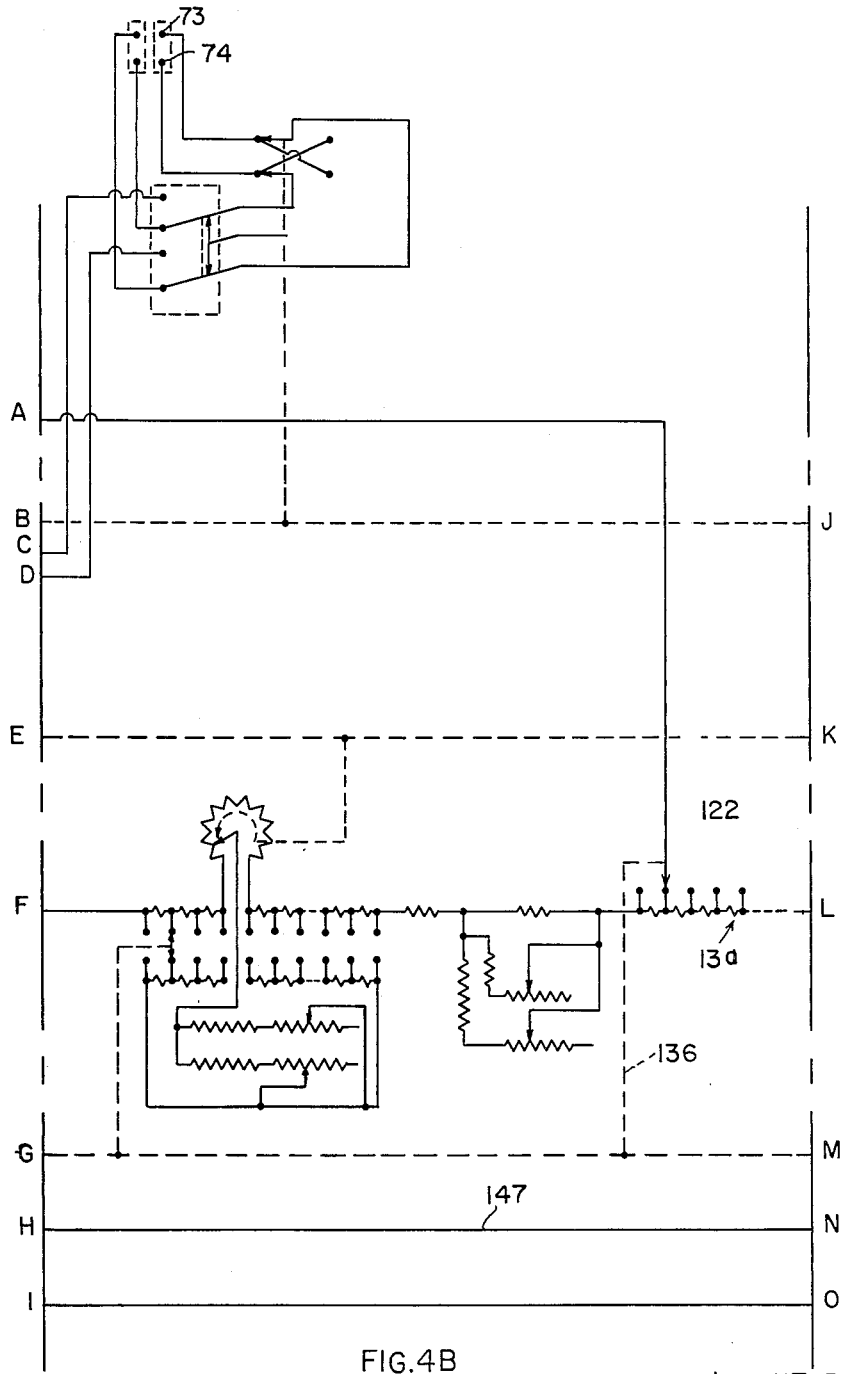

FIGURES 3A, 3B and 3C when combined show the circuit of one embodiment of the present invention; and FIGURES 4A, 4B and 4C when combined show the circuit of another and simplified embodiment of the present invention.

With reference to FIGURE 1, curve 1 is a typical temperature resistance relationship for a platinum resistance thermometer which may be defined approximately in the range between 0° C. to 630° C. by the quadratic equation $$R_T = R_0(1 + AT + BT^2)$$

where $R_0$ is the resistance of the thermometer at 0° C., $R_T$ is the resistance of the thermometer at a particular temperature T, A and B are two of the parameters of the thermometer. The parameters $R_0$, A and B may vary from thermometer to thermometer as shown in FIGURE 1. A variation of the parameter of $R_0$ results in an overall variation in the resistance ordinate of the curve as shown by curve 2 where the reduction in the value of $R_0$ has resulted in an overall reduction in the resistance ordinate. A variation in the parameter A varies the initial slope of the curve as shown by curve 3 where an increase in A has resulted in an increase in the initial slope of the curve. A variation in the parameter B varies the curvature, (The rate of change of the slope) of the temperature-resistance relationship, as shown by curve 4 where an increase in the value of the parameter B has resulted in an increase in the change of slope of the curve. My invention provides circuit adjustment means for the variation of these parameters to facilitate the direct reading of temperatures despite the fact that different platinum resistance thermometers are used. The circuit makes use of the fact that, for a given platinum resistance element, $R_0$, A and B do not vary over a wide range (less than 1%) so that it is possible to build the resistance variations of a representative thermometer into a resistance network and then allow for the introduction of small corrections to compensate for the differences between the constants of the particular platinum resistance elements being used and those of the representative one.

FIGURE 2 is a simplified schematic diagram of the circuit according to this invention in which a platinum resistance element 10, a first variable resistance element denoted generally by 11 and referred to in the claims as the third variable resistance network, a second variable resistance element denoted generally by 12, a calibrated tapped resistance element denoted generally by 13 referred to in the claims as the first variable resistance network, a third variable resistance element indicated generally by 14, and a manually adjustable rheostat 15 are connected in series across a source of direct current 16. The calibrated tapped resistance element 13 is made up of individual resistors 17 which are connected in series and separated by taps 18 which are adapted to be engaged by a sliding contact 19. Contact 19 is electrically connected to a ballistic galvanometer 20 which is adapted to measure by means of an isolating potential comparator system, indicated generally at 21, the difference between a first voltage appearing across the platinum resistance element 10 and a second voltage appearing across the combination of the first and second variable resistance elements 11 and 12 and the sum of the individual resistances 17 of the tapped calibrated resistance element 13 across which the galvanometer 20 has been connected through contact 19.

The individual resistances 17 of the tapped calibrated resistance element 13 are not identical but are adjusted to follow the temperature-resistance characteristic of a representative platinum resistance element which has a constant A which is close to the average of recent platinum thermometers and a constant B which is slightly less than that of actual platinum thermometers. The deficiency in the magnitude of B corresponds to a slightly smaller curvature in the characteristic than is in fact found. To compensate for this deficiency in the value of B, the operation of the first variable element 11 introduces the required additional amount of curvature corresponding to the temperature-resistance characteristic of the platinum element 10 actually being used as will be discussed in more detail subsequently. In the selection of the resistances 17, allowance is made for the shunting effect provided by variable resistance element 23 referred to in the claims as the fourth variable resistance network. With the value of the individual resistances 17 selected as described above, taps 18 of element 13 can be marked so that the temperature of platinum element 10 is indicated directly by the position of sliding contact 19 on taps 18. Galvanometer 20 will show zero deflection when the temperature of platinum element 10 is such that the resistance of element 10 is equal to the sum of the resistances of elements 11 and 12 plus that part of element 13 which is bridged by galvanometer 20. However, if the resistance of platinum element 10 is not defined exactly by the sum of the resistances of elements 11 and 12 plus same part of element 13 defined by a tap 18, then the galvanometer will be deflected by the current imbalance which will result. The amount of the galvanometer deflection will be proportional to the size of the current imbalance.

If it were assumed that the resistances contained within rectangle 22 were of infinite value, then the circuit could be used only with a platinum resistance element 10 which had values for constants $R_0$, A and B identical with those determined by the fixed values of resistances 23, 24 and 17. To over come this difficulty and to permit flexible operation of the circuit, variable resistance elements 11, 12 and 23 have been incorporated in the circuit.

To provide for variations in the value of $R_0$, a fourth variable resistance element denoted generally at 23 is connected in parallel with the first and second variable resistance elements 11 and 12 and the tapped resistance element 13. Variable element 23 is made up of a slidewire 25a whose shunting effect may be varied by means of an engaging sliding contact 25. An increase in the resistance of element 23 has the effect of increasing the amount of current flowing through elements 11, 12 and 13, while a decrease in the value of element 23 has the opposite effect. A fixed resistance 25b establishes a minimum limit on the shunting effect of element 23. In practice, the $R_0$ adjustment is made manually by setting a contact 19 to a tap 18 on resistance element 13 which corresponds to 0° C., then placing the platinum resistance element in an ice bath and adjusting element 23 by moving sliding contact 25 over resistance 25a until galvanometer 20 shows zero deflection.

The first variable resistance element 11 is provided to allow for adjustments in the value of the ratio $B/A$ since it has been found to be impractical to make an adjustment of the variable B only. The element 11 is composed of identical resistances 45 and 26 which are engaged by a common sliding contact 27 which is mechanically connected by a linkage 28 to the sliding contact 19 of tapped calibrated resistance element 13. The initial setting of the $B/A$ term is made by manually adjusting sliding contact 29 along slidewire 30. As has been mentioned earlier, the individual resistances 17 of element 13 are selected to give a resistance-temperature characteristic which has a constant B which is slightly less than that of a practical platinum resistance element 10, resulting in a slight deficiency in the amount of curvature in the characteristic of the representative, as compared to that of the actual, platinum resistance element. To remove this deficiency in curvature, the element 11 is adapted to introduce the necessary incremental square-law correction needed to increase the curvature of the circuit temperature-resistance characteristic to conform with that of the actual platinum resistance element 10 which is being used in the circuit. The square-law correction is obtained through the movement of sliding contact 27 along resistances 45 and 26. The position of contact 27 is determined by the position of sliding contact 19 of element 13 through mechanical linkage 28. Contact 19 is moved from left to right with increasing temperature settings, resulting in a left to right movement of contact 27 along resistances 45 and 26 which produces a small quadratic reduction in the resistance of element 11 with increasing temperature settings. The size of this quadratic reduction is dependent on the initial manual setting of contact 29 along slidewire 30 which provides the initial shunting effect.

The second variable resistance element 12 is made up of a resistance 24 connected in parallel with the series combination of resistance 31a and slidewire 31. By means of a sliding contact 32, the shunting effect of slidewire 31 may be varied. Resistance 31a establishes a limit upon the maximum shunting effect. The resistance element 12 is provided as a means of varying the resistance that is in series with the tapped resistance element 13 so that the value of the resistance of element 13 can be made a larger or smaller fraction of the total resistance made up of elements 11, 12 and 13 connected in series. This, in effect, corresponds to a change in the constant A of the representative platinum resistance element, producing a change in the initial slope of its temperature-resistance curve to conform it with that of the platinum element 10 being used in the circuit.

The galvanometer 20 which measures the residual voltage difference between a first voltage measured across the platinum resistance element 10 and a second voltage measured across elements 11 and 12 and that part of element 13 bridged by contact 19 will indicate no deflection whenever the temperature of the platinum resistance element 10 is one defined by one of the taps 18, since taps 18 are marked to provide a quadratic temperature resistance relationship as discussed previously. At these defined settings the precise value of the current through the circuit is immaterial because of the galvanometer 20 will not be deflected. However, at temperatures other than those defined by the taps 18 of the resistance element 13, the deflection of the galvanometer 20 will be proportional to the current flowing through the circuit and the incremental difference in resistance between the platinum resistance element 10 and the setting of the resistance circuit. The incremental difference in resistance in respect to increments of temperature is not a constant because of the curvature of the temperature-resistance characteristic as shown in FIGURE 1. In order to maintain constant galvanometer deflection for a constant temperature difference, regardless of its position on the temperature scale, the current supplied by the direct current source 16 must increase as the ratio of incremental resistance to incremental temperature decreases. This change in current is accomplished by means of the third variable resistance element 14 which is made up of a slide-wire 33 and an engaging sliding contact 34. The contact 34 is mechanically connected through a linkage 35 to the sliding contact 19 of tapped resistance element 13. As the contact 19 is moved from left to right, the contact 34 is moved from right to left decreasing the effect of resistance element 14, thus increasing the value of current supplied by the direct current source 16. In the range from −50° C. to +630° C. there is a variation of about 13% in the ratio of incremental resistance to incremental temperature, so that this latitude of current adjustment must be provided in element 14. The accuracy of the current setting must be the accuracy required for the deflection measurement which is of the order of .1 to .2%.

The construction and operation of the isolating potential comparator system indicated generally at 21 has been disclosed in United States Patent 2,798,198 issued to T. M. Dauphinee July 2, 1957. A capacitor 36 is connected between contacts 37 and 38 which are adapted to pulsate in unison between fixed contact pairs 39, 40 and 41, 42 respectively. As a result of the operation of contacts 37 and 38, capacitor 36 is charged to the voltage appearing across platinum element 10 when contacts 37 and 38 engage contacts 39 and 40 respectively. When contacts 37 and 38 later engage contacts 41 and 42 respectively, the voltage across capacitor 36 is opposed by that appearing across elements 11 and 12 and that part of element 13 bridged by galvanometer 20 by means of contact 19. Any difference in these two voltages causes a deflection of galvanometer 20 which is proportional to the current flowing through it.

In the circuit shown in FIGURE 2, the A and B/A adjustments are essentially independent of one another but each effects the $R_0$ setting. The setting B/A is unaffected by an increment of A but A is slightly affected by an increment in B/A. However, this effect is not enough to disturb the design accuracy of the overall instrument.

FIGURES 3A, 3B and 3C show one embodiment of the invention in which elements corresponding to those previously discussed with respect to FIGURE 2 have been given the same reference numerals. The right hand edge of FIGURE 3A is matched with the left hand edge of FIGURE 3B so that reference letters A to J are aligned. Similarly, the right hand edge of FIGURE 3B is matched with the left hand edge of FIGURE 3C so that reference letters K to S are aligned.

A source of direct current 16 is made up of a series of batteries 40. The current output from the batteries 40 is manually controlled by the network 15 which is made up of two sliding contacts 41 and 42 which are mechanically connected by a linkage 43 and which slidably engage with current taps 44 which provide coarse control of the output current. Fine control of the output current from the source 16 is obtained by moving a sliding contact 47 along continuous slide wire 46. The output current is measured by a milliammeter 48 and passes through a potential reversing switch 49.

The tapped calibrated resistance element 13 of FIGURE 2 has been split up into three separate tapped resistance elements in FIGURE 3 and designated 13a, 13b and 13c. The first tapped element 13a is connected in series with the platinum resistance element 10 and the variable resistance 11, 12 and 14. Element 13a is made up of a first and second series of resistances 50 and 51. The resistances 50 and 51 are arranged in pairs such that each pair which commences with a resistance 51 is defined by a first series of taps 52 and each pair which commences with a resistance 50 is defined by a second series of taps 55. The individual resistances 50 have values which are selected to conform to the quadratic temperature-resistance characteristic of a representative platinum resistance element as was discussed previously with respect to FIGURE 2. In the choice of these resistances 50, allowance must be made for the shunting effect caused by element 23. The purpose of the resistances 51 will be discussed subsequently.

Element 13b consists of a series of resistances 56 which are connected across a pair of sliding contacts 53 and 54. Contacts 53 and 54 are in fixed spatial relationship with contact 53 adapted to engage the first series of taps 52 and contact 54 adapted to engage the second series of taps 55, the spatial relationship being such that contacts 53 and 54 bridge a pair of resistances 51 and 50 plus a further resistance 51 which is associated with the adjacent pair of resistances 51 and 50 which is situated to the right (or high temperature side) of the pair in question. The further resistance 51 is chosen to overcome the shunting effect of element 13b upon 13a and has a resistance value selected such that the full span of tapped element 13b is exactly equivalent to the temperature increment represented by the unbridged value of the resistance 50 located between contacts 53 and 54.

The individual resistances 56 of element 13b are separated by taps 57 which are adapted to be engaged by a sliding contact 57a. The values of resistances 56 are chosen to conform with the variation of the representative platinum resistance element in the middle of its temperature range, that is, around 200° C. Since resistance element 13b is designed to carry only about 1% of the current carried by resistance element 13a, errors resulting from variations in the resistances of sliding contacts 53 and 54 is minimized.

The third tapped resistance element designated generally 13c is made up of identical resistors 58 which are separated by taps 59 along which a sliding contact 60 is adapted to move. Third tapped element 13c forms part of a constant current branch generally designated as 61 of a current checking element generally designated 62 which includes a slide wire 63 which engages a sliding contact 64 connected through the platinum resistance element 10 to the source of direct current 16, and a second resistance branch generally designated 65 which is connected in parallel with the first resistance branch 61. Contact 64 is mechanically connected through linkages 66 and 67 to sliding contacts 53 and 54 of first tapped element 13a and sliding contact 57a of second tapped element 13b, respectively. With increased settings of contacts 53, 54 and 57a corresponding to increasing temperature, sliding contact 64 is driven toward the bottom of FIGURE 3A, resulting in an increase in the resistance of branch 61 and a corresponding decrease in the resistance of a second branch 65. As discussed previously in FIGURE 2, to maintain galvanometer sensitivity at high temperatures, it is necessary to increase the value of the current from the direct current source 16 by 13% to compensate for the decrease in the ratio of the incremental resistance to incremental temperature. However, while the total current in the circuit increases with increasing temperature settings by a total of 13% as a result of a mechanical linkage of network 14 with the contacts of the tapped resistance elements 13a and 13b, the current through branch 61 of current checking element 62 is being decreased by the same amount with the same increment in temperature, as a result of the movement of contact 64 downward along slide wire 63 as a result of the mechanical interconnections 66 and 67 with the contacts of the tapped resistance elements 13a and 13b. While the total current through the circuit increases by a certain amount, the current passing through branch 61 decreases by the same amount, resulting in a constant current in that branch. The current checking operation is carried out by measuring the voltage across a resistance 68 forming part of constant current branch 61. This voltage appears between conductors 69 and 70, between terminals 71a and 71b of current checking switch 71, across a potential reversing switch 72, and finally across terminals 73 and 74 which are adapted to be connected to a ballistic galvanometer 20. The current through branch 61 containing resistor 68 is adjusted so that when the current checking switch 71 is operated, some required deflection a galvanometer 20 connected across contacts 73 and 74 is registered and this same deflection will then be a correct deflection for all temperature settings despite the fact that the total circuit current varies 13% over the entire temperature range.

While it is to be understood that the third tapped calibrated resistance element 13c could have sliding contacts adapted to bridge a single resistance 56 of second tapped element 13b, it is convenient to place element 13c in branch 61 of the current checking circuit 62 which carries constant current for all values of temperature. Since the current in element 13c need only be known to somewhat better than 1%, a linear scale can be used. Thus, as discussed previously, element 13c is made up of identical resistors 58 which are separated by taps 59 adapted to engage a sliding contact 60. The element 13c has a total resistance such that the total voltage drop across the element is equivalent to that which occurs across a single resistor 56 of element 13b, the resistor 56 chosen being approximately at the mid-range of element 13b.

The current control element generally indicated at 14 is similar to that shown in FIGURE 2 in that a contact 34 is adapted to move along slidewire 33. However, in this embodiment the position of the contact 34 is determined by its mechanical engagement through linkages 75 and 75a with sliding contacts 53 and 54 of element 13a and also through mechanical linkages 76 and 77 to sliding contacts 57a of element 13b. As discussed previously, the purpose of element 14 is to increase the current flowing through the circuit to maintain constant galvanometer sensitivity with increasing temperature settings of the tapped resistance elements 13a and 13b.

The $R_0$ adjustment element which matches the ice point of the circuit to that of the particular platinum resistance element is shown generally at 23 where a tapped resistance element 78 and a continuous slide wire 79 are connected in series with the first tapped resistance element 13a. Tapped resistance 78 is made up of identical individual resistors 80, each separated by a tap 81 which adapted to engage a sliding contact 82 whose movement provides a coarse adjustment for the value of $R_0$. Fine adjustment is provided through the movement of a contact 83 along continuous slide wire 79. Elements 11, 12, and 13a are shunted by both the coarse and fine adjustment means provided in $R_0$ adjustment 23. The coarse adjustment shunt is provided through contact 82, conductor 84, identical parallel resistors 85 and conductors 86 and 87 which are connected to the first branch 61 and the second branch 65 respectively of current checking element 62. The shunting effect of the fine adjustment is provided through contact 83, identical parallel resistors 89 and conductors 86 and 87. For each pair of identical resistors 85 and 89, one resistor is connected to conductor 86 while the other is connected to conductor 87. The reason for the use of parallel resistance combinations 85 and 89 in conjunction with conductors 86 and 87 is that it is not desirable to connect the $R_0$ adjusting element 23 outside the sliding contact 64 of the current check circuit 62 since variations of the overall resistance of that contact and of the current checking circuit would cause changes in the apparent $R_0$ of the circuit.

Variable element 11 which is adapted to permit changes in the ratio $B/A$ is essentially the same as that discussed with regard to FIGURE 2. The initial value of the ratio $B/A$ is determined by a tapped coarse adjustment resistance 90 which is engaged by a sliding contact 91. In parallel with this is a continuous slide wire 92 which is engaged by a sliding contact 93 providing continuous fine adjustment of the $B/A$ ratio. The addition of the quadratic correction factor as discussed previously in relation to FIGURE 2, is accomplished in this embodiment by separate means controlled by the moving contacts 53, 54 and 57a of the first and second tapped resistance elements 13a and 13b respectively. The correction factor for the first resistance element 13a is provided by the movement of a two-contact sliding contact 27 which is adapted to engage simultaneously two series of taps 94 and 95 which separate a series of identical resistances 96 forming part of identical resistance elements 23 and 26. The position of sliding contact 27 is determined by a mechanical linkage including links 97, 98 and 75a which connect contact 27 with sliding contacts 53 and 54 of second tapped resistance element 13b. The control of the quadratic factor by the position of sliding contact 57a of second tapped resistance element 13b is provided by means of a mechanical linkage including link 77 and 99 which adjust the position of sliding contact 100 along a continuous slide wire 101 which forms a part of tapped resistance 23. No adjustments in the quadratic factor are required for changes of the element 13c since the full scale of this element represents only a small percentage of the total resistance in the circuit.

The variable resistance element 12 which is used to adjust for changes in the constant A of the platinum resistance element is essentially the same as that described in FIGURE 2 except that a coarse adjustment made up of a tapped resistance 102 which is engaged by a sliding contact 103 has connected in parallel with it a continuous slide wire 104 which is engaged by a sliding contact 105 to provide a fine means of adjustment of the constant A. Both the coarse and fine adjustment 102 and 104 are connected in parallel with the resistance 24 which is in series with the first tapped resistance element 13a.

The isolating potential comparator circuit 21 permits the determination of the difference between a first voltage appearing across the platinum resistance element 10 and a second voltage measured between the sliding contact 60 of third tapped resistance element 13c and the sliding contact 57a of the second tapped resistance element 13b. In this embodiment the voltages are compared by means of two vibrating or rotating switches 106 and 107 having capacitors 108 and 109 connected through reversing switches 110 and 111 to separate movable switch contacts 112 and 113 for switch 106 and 114 and 115 for switch 107. In operation the movement of the switch contacts 112, 113, 114 and 115 alternately charges capacitors 108 and 109 to the voltage appearing across platinum resistance element 10 and then compares this with the voltage appearing between sliding contacts 60 and 57a which are connected to terminals 116 and 117. A more complete description of the structure and operation of the isolating voltage comparator 21 will be found in United States Patent No. 2,798,198 mentioned previously.

Provision is made in the embodiment of FIGURE 3 for reversing the polarity of all voltages in the circuit to eliminate the effects of thermal electromotive forces in the circuit. Thus, the polarity reversing switch 49 which connects the source of direct current 16 into the circuit is mechanically connected through linkages 116 and 117 to polarity reversing switch 72 in the current check circuit, and through mechanical linkages 116 and 118 to the polarity reversing switches in the voltage comparing circuit 21.

An alternative and in some ways preferable form of my invention is shown in FIGURES 4A, 4B and 4C which may be arranged in that order from left to right to form the circuit of this embodiment. Reference letters A to I inclusive on the right hand edge of FIGURE 4A must be aligned with corresponding reference letters on the left hand edge of FIGURE 4B, while reference letters J to O inclusive on the right hand edge of FIGURE 4B must be aligned with the corresponding reference letters on the left hand edge of FIGURE 4C. Since this embodiment is in many ways similar to the embodiment of FIGURES 3A, 3B and 3C, the same reference numerals will be used for corresponding circuit elements and no further explanation of the elements in FIGURE 4 which are identical to those used in FIGURE 3 will be given.

In this embodiment first tapped resistance element 13a is of the simple potential tap type made up of individual resistors 120 which form the quadratic resistance temperature characteristic discussed previously. The individual resistances 120 are separated by a series of taps 121 which are calibrated in terms of the temperature increments of the representative platinum resistance element. A sliding contact 122 is adapted to engage the taps 121.

The second tapped resistance element 13b has been moved into the constant current branch designated generally as 61 of current checking network 62. Element 13b is made up of individual resistances 123 separated by taps 124. The resistances 123 are chosen to follow a quadratic relationship corresponding to the middle range around 200° C. on the resistance temperature characteristic of the representative platinum resistance element discussed previously as the basis for this circuit design. Third tapped resistance element 13c has contacts 125 and 126 which are in fixed space relationship; their spacing being equivalent to the spacing of a specified number of taps 124 of element 13b, shown as one space in FIGURE 4. The resistance of element 13c is made up of a series of individual resistances 127 connected in series across the contacts 125, 126 and separated by taps 128. The total voltage drop across element 13c is adjusted to be equal to the voltage drop across the resistances 123 of element 13b which are located between the taps 124 which are contacted by contacts 125 and 126. The total voltage drop across the resistance element 13b is made equivalent to the voltage drop across a resistance 120 of first element 13a located around 200° C. A contact 129 is adapted to slidably engage taps 128 of third tapped resistance element 13c. The voltage between tap 129 of third tapped resistance element 13c and that of tap 122 of first tapped resistance element 13a appears across terminal 116 and 117, as discussed previously with respect to FIGURE 3.

The current checking network 62 has been modified by introducing a tapped resistance 130 in the lower branch 65. The resistance of element 130 is made about 25 times the total resistance of upper branch 61. Element 130 is made up of individual resistors 131 separated by taps 132 which engage a sliding contact 133 which is connected at point 134 to upper branch 61. The individual resistors 131 of element 130 are very nearly identical since this branch 65 is designed to carry only ¹⁄₂₅ of the total current entering the current checking circuit 62, only four slight changes in resistance valves being required over the whole range of element 130. The position of contact 133 along tap 132 is determined by the position of contact 122 of first tapped element 13a by means of mechanical linkages 135 and 136. As discussed in relation to FIGURE 2, because the total current in the circuit is increased with increasing temperature through the operation of current adjusting element 14 to provide uniform galvanometer sensitivity despite a reduction in the incremental resistance to incremental temperature ratio of the circuit, it is necessary at the same time to decrease the amount of current flowing through the constant current branch 61 of current checking circuit 62. This is accomplished by reducing the value of the resistance of branch 65 with increasing temperature settings of the first tapped resistance element 13a, so that the proportion of current flowing through upper branch 61 of element 62 will be reduced by the same amount as the total current in the circuit is increased, thus maintaining the current in branch 61 constant. To insure that a predetermined voltage will appear across the output terminals 73 and 74 of current checking network 62, a resistance 137 is connected in series in the upper branch 61 and engaged by a sliding contact 138 which is connected by means of a mechanical linkage 139 with the sliding contacts 125 and 126 of third tapped resistance element 13c. As contacts 125 and 126 are moved along taps 124 of element 13b with increasing temperature, contact 138 is moved from left to right along resistance 137, thus compensating for the influence of the position of the second tapped resistance element which, through the variable resistance element 14, increases the total amount of current through the circuit as a function of the temperature setting of the second tapped resistance element 13b. It is to be noted that the movement of contact 138 does not affect in any way the current flowing through branch 61 of element 62, but that the position of contact 138, as it moves from left to right, by reducing the amount of resistance between terminals 73 and 74 as a function of the position of the second tapped resistance element 13b, will maintain the voltage drop across elements 73 and 74 at a predetermined value essentially independent of the temperature settings of elements 13a and 13b.

In this embodiment of the invention, current adjusting element 14 is made up of a first slide wire resistance 140 which is engaged by a sliding contact 141 whose position is influenced by the position of the sliding contact 122 of first tapped resistance element 13a through a mechanical linkage 142 and 136. As contact 122 moves from left to right contact 141 moves from right to left, decreasing the effective resistance of the circuit and increasing the amount of current flowing through the circuit to provide for constant galvanometer sensitivity despite the quadratic relationship between resistance in temperature which results in a 13% decrease in the ratio of incremental temperature to incremental resistance in the circuit. Contact 141 is connected to a resistance 143 which is engaged by a sliding contact 144 whose other end is connected through polarity reversing switch 49 to the source of direct current 16. The position of sliding contact 144 is influenced by the movement of the contacts 125 and 126 of third tapped resistance element 13c along second tapped resistance element 13b. Contact 144 is connected by means of a mechanical linkage 145 and 146 to contacts 125 and 126. As contacts 125 and 126 move from left to right with increasing temperature setting, contact 144 moves from top to bottom on FIGURE 4A and reduces the effect of resistance 143 in the circuit. This means that the current from the direct current source 16 is increased as a function of the position of contacts 125 and 126 to maintain constant galvanometer sensitivity despite the quadratic relationship of the resistance element 13b.

The variable resistance element 23 is essentially the same as that discussed in relation to FIGURE 2 except that the coarse adjustment contact 82 is now connected through a single resistor 146 to a conductor 147 and similarly fine adjustment contact 83 is connected to another resistor 148 to conductor 147. In this embodiment of the invention the total resistance of the current checking circuit 62 is almost independent of switch setting so that the network 23 can be connected through conductor 147 to point 149 which is outside the current checking network 62. This simplification over the network 23 of FIGURE 3 results since none of the switch contacts within element 62 are in direct series with the main current from the source 16, so that errors in the effective $R_0$ of the circuit will be small.

What we claim as our invention is:

1. A resistance thermometer comprising: a platinum resistance element having a temperature-resistance characteristic which can be represented by the equation $R_T = R_0 (1 + AT + BT^2)$ where $R_0$ is the resistance of the platinum element at zero degrees Celsius, A and B are two constants determined by the platinum resistance element, $R_T$ is the resistance of the element at a temperature T, and T is the temperature of the resistance element in degrees Celsius; a two-terminal measuring circuit having a first variable resistance network, a second variable resistance network in series with the first variable resistance network, a third variable resistance network in series with the first and second variable resistance networks, one terminal of the first resistance network forming the first terminal of the measuring circuit, and a fourth variable resistance network each of whose terminals is connected to only one of the terminals of the network formed by the first, second, and third variable resistance networks in series; the first variable resistance network consisting of a plurality of resistors in series and adapted to be tapped between any two consecutive resistors, the resistances of the resistors being chosen so that the resistance measured between the tap and the second terminal of the measuring circuit is approximately given by $R_N=R_0(1+AnN+Bn^2N^2)$ where $R_0$, A, and B are defined above, $R_N$ is the resistance measured between the second terminal and the Nth tap, N is the tap number, and $n$ is a conversion factor between N and T whereby $R_N$ is at least approximately equal to $R_T$ where $nN=T$; the resistance of the second variable resistance network being adjustable to compensate for variation in A from one platinum resistance element to another; the third variable resistance network including a first and a second adjustable resistance, the first adjustable resistance adapted to be adjusted independently and the second adjustable resistance adapted to be adjusted linearly simultaneously with a linear variation in N, the values of the first and second adjustable resistances being chosen so that variations in $B/A$ from one platinum resistance element to another are adapted to be compensated for; the resistance of the fourth variable resistance network being adjustable to compensate for variations in $R_0$ from one platinum resistance element to another; whereby if $R_N=R_T$, then the platinum resistance element is at a temperature T given by $T=nN$; and comparison means adapted to compare the resistance of the measuring circuit to the resistance of the platinum element.

2. A resistance thermometer as claimed in claim 1, wherein the measuring circuit and the platinum resistance element are connected in series with a direct voltage source, the comparison means being a device adapted to compare the voltage across the measuring circuit to the voltage across the platinum resistance element.

3. A resistance thermometer as claimed in claim 1 wherein the voltage source, measuring circuit and platinum resistance element are in series with a fifth resistance network comprising a third and a fourth adjustable resistance, the third adjustable resistance being independently adjustable and the fourth adjustable resistance being adapted to be adjusted linearly simultaneously with a linear variation in N, whereby the current through the resistance thermometer is adjusted so that the difference between the voltage across the measuring circuit and the voltage across the platinum resistance element is a constant multiple of the difference between the temperature indicated by the measuring circuit as determined from $T=nN$ and the temperature of the platinum resistance element, provided N is selected so that the said voltage difference is a minimum.

4. A resistance thermometer as claimed in claim 3 wherein the comparison means is a ballistic galvanometer.

5. A resistance thermometer as claimed in claim 3 and additionally comprising a ballistic galvanometer, a capacitor, a switch adapted in a first position to connect the capacitor in parallel with the platinum resistance element and in a second position to connect the ballistic galvanometer and the capacitor in series, this series combination being in parallel with the resistance between the Nth tap and the second terminal of the measuring circuit.

6. A resistance thermometer as claimed in claim 3 wherein the temperature interval over which the thermometer is adapted to read temperature extends from −50° C. to 460° C.

7. A resistance thermometer as claimed in claim 3 wherein each tap of the first variable resistance network is identified by a value of T determined by $T=nN$.

8. A resistance thermometer as claimed in claim 7 wherein the temperature interval over which the thermometer is adapted to read temperature extends from −50° C. to 460° C.

9. A resistance thermometer for measuring temperatures in the range −50° C. to 460° C., comprising a platinum resistance element having a temperature-resistance characteristic which can be represented by the equation $R_T=R_0(1+AT+BT^2)$ over the temperature interval −50° C. to 460° C., where $R_0$ is the resistance of the platinum element at 0° C., A and B are two constants determined by the individual platinum resistance element, T is the temperature of the resistance element in degrees Celsius, and $R_T$ is the resistance of the platinum resistance element at the temperature T° Celsius; a two terminal measuring circuit in series with the platinum resistance element; a direct voltage source in series with the platinum resistance element and the measuring circuit; a current limiter in series with the measuring circuit, the voltage source and the platinum resistance element; a double throw double pole switch; a capacitor adapted to be connected in parallel with the platinum resistance element in the first throw of the switch, one terminal of the capacitor adapted to be connected to a first terminal of a ballistic galvanometer and the other terminal of the capacitor adapted to be connected to the second terminal of the measuring circuit in the second throw of the switch; the measuring circuit comprising a first, second, third and fourth resistance network, the first, second and third resistance networks being in series, one terminal of the first resistance network being the first terminal of the measuring circuit, the fourth resistance network being connected in parallel with the terminals of the measuring circuit, the second terminal of the measuring circuit being connected directly to the platinum resistance element, the first resistance network including a first plurality of resistors and adapted to be tapped between any two consecutive resistors by the second terminal of the ballistic galvanometer, the second resistance network having a fixed resistor in parallel with a variable resistor, the third resistance network including a first rheostat, a second rheostat in parallel with the first rheostat, a third rheostat whose tap is directly connected to the tap of the first rheostat, the position of the said taps of the first and third rheostats being simultaneously varied as a result of variation of the tap on the first resistance network by the ballistic galvanometer, one terminal of the third rheostat being electrically insulated from the rest of the circuit, the other terminal being directly connected to the tap on the second rheostat, the fourth resistance network comprising a variable resistance, the current limiter comprising a first variable resistance adapted to be independently adjustable and a second variable resistance adapted to be varied as a result of a variation of the tap on the first resistance network by the ballistic galvanometer all resistance values and variations adapted to be chosen so that at a given tap position of the second terminal of the ballistic galvanometer on the first resistance network, the temperature of the platinum resistance element is given by $T=\theta+K\Delta V$, where $\theta$ is a known temperature coresponding to the said given tap position of the second terminal of the galvanometer on the first resistance network, K is a known constant, and $\Delta V$ is the voltage change measured by the galvanometer when the switch is switched quickly from its first throw to its second throw.

10. A resistance thermometer comprising a platinum resistance element having a temperature-resistance characteristic which can be represented by the equation $R_T=R_0(1+AT+BT^2)$ over the temperature interval −50° Celsius to 460° Celsius, where $R_0$ is the resistance of the platinum element at 0° Celsius, $R_T$ is the resistance of the platinum element at T° Celsius, and A and B are two constants determined by the individual platinum resistance element; a two-terminal measuring circuit having a first, second, third and fourth resistance network, the first, second and third resistance networks being in series, one terminal of the first resistance network being the first terminal of the measuring circuit, the fourth resistance network being connected in parallel with the terminals of the measuring circuit, the first resistance network including a first plurality of resistors and adapted to be tapped between any two consecutive resistors by means of taps connected between consecutive resistors, the second resistance network having independently variable resistance and adapted to compensate for variations in A from one platinum resistance element to another, the third resistance network including an independently variable resistance and a variable resistance adapted to be varied as the position at which the first resistance network is tapped is varied, the third resistance network being adapted to compensate for variations in $B/A$ from one platinum resistance to another, the fourth variable resistance network having independently variable resistance and adapted to compensate for variations in $R_0$ from one platinum resistance element to another; and comparison means adapted to compare the resistance of the platinum resistance element to the resistance measured between any tap of the first resistance network and the second terminal of the measuring circuit and adapted to measure the difference between the compared resistance values.

References Cited in the file of this patent

UNITED STATES PATENTS

| | | |
|---|---|---|
| 950,513 | Northrup | Mar. 1, 1910 |
| 2,648,224 | Phillips et al. | Aug. 11, 1953 |

FOREIGN PATENTS

| | | |
|---|---|---|
| 630,638 | Great Britain | Oct. 18, 1949 |
| 549,576 | Canada | Dec. 3, 1957 |
| 789,000 | Great Britain | Jan. 15, 1958 |